K. MERZIK.
HAT FASTENER.
APPLICATION FILED JULY 31, 1912.
1,064,239.
Patented June 10, 1913.
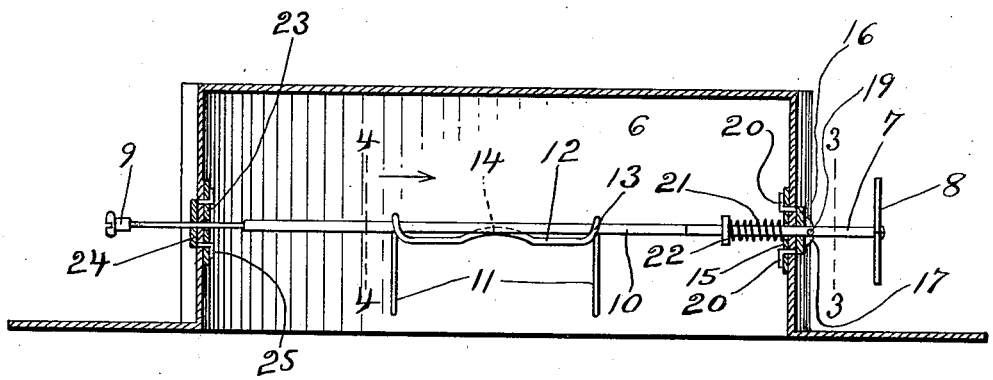
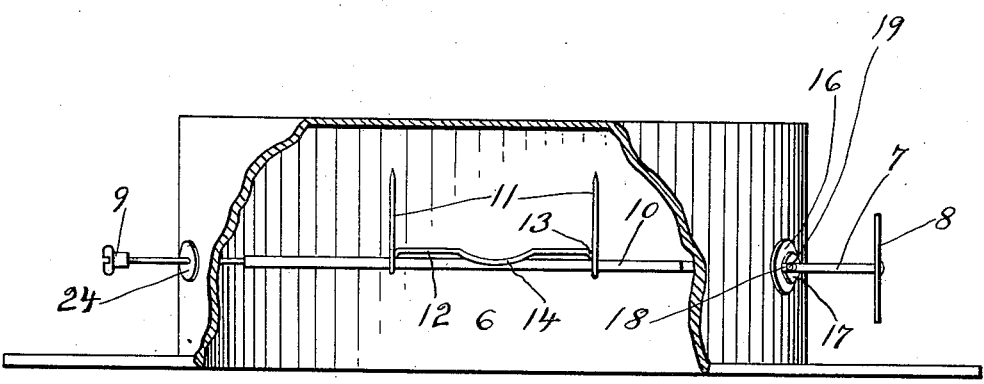
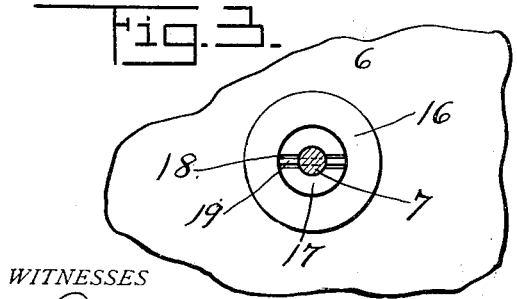
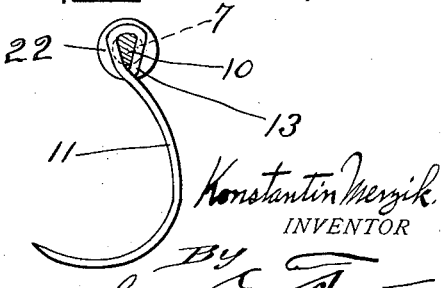
WITNESSES
L. Cloud Newman.
Edith L. Smith
Konstantin Merzik.
INVENTOR
By
Geo. E. Few.
Attorney
COLUMBIA PLANOGRAPH CO., WASHINGTON, D. C.

UNITED STATES PATENT OFFICE.

KONSTANTIN MERZIK, OF DETROIT, MICHIGAN.

HAT-FASTENER.

1,064,239.  Specification of Letters Patent.  Patented June 10, 1913.

Application filed July 31, 1912. Serial No. 712,491.

*To all whom it may concern:*

Be it known that I, KONSTANTIN MERZIK, a subject of the Emperor of Austria-Hungary, but having declared my intention to become a citizen of the United States, residing at Detroit, in the county of Wayne and State of Michigan, have invented certain new and useful Improvements in Hat-Fasteners, of which the following is a specification.

This invention relates to hat fasteners, and has for its object to provide an improved device for holding a hat upon the head of the wearer by means of a pair of hooks which are mounted upon a pin or rod which can be turned to cause the hooks to engage in the hair of the wearer of the hat. The device is attached to and remains on the hat, and the pin can be turned to engage or disengage the hooks. Means are provided for locking the pin against rotation after the hooks are engaged, so that the fastening cannot be accidentally disengaged.

The invention is illustrated in the accompanying drawings in which—

Figure 1 is a sectional view of a hat provided with the device. Fig. 2 is a similar view, with the pin shifted so that it can be turned. Fig. 3 is a section on the line 3—3 of Fig. 1. Fig. 4 is a section on the line 4—4 of Fig. 1.

Referring specifically to the drawings, 6 indicates the hat which may be of any desired type. A pin or rod 7 is placed in the hat, and said pin may be provided with a head 8 at one end, and at the other end the pin is threaded to receive a nut 9. The middle part of the pin, that is the part which is located within the crown of the hat, is flattened as indicated at 10. The hooks 11 are mounted upon this flattened part of the pin, said hooks being formed of a piece of wire bent to the proper shape to form the hooks and to produce a connecting bar 12 between the eyes 13 which extend around the pin at the inner end of the hooks, and said bar 12 is offset at the middle as indicated at 14, to engage under the flattened part of the pin so as to form a spring clip or clasp which by its friction holds the hooks in place on the pin, and inasmuch as the eyes 13 correspond to the flattened shape of the pin the latter will not turn in the eyes, but the hook may be slid along on the pin to the position desired.

For fastening the pin to the hat I provide the following devices: Near the head end of the pin it is provided with an inner plate 15 and outer plate 16, the latter having a boss 17 with notches 18 adapted to receive a cross pin or cotter 19 fixed in a hole in the pin 7. The plate 16 is provided with prongs 20 which may be inserted through the wall of the crown of the hat and through holes in the plate 15 the ends of the prongs being bent over to clamp the hat between the plates 15 and 16. A spring 21 confined between the plate 15 and a friction washer 22 normally pushes the pin inwardly with respect to the hat, and holds the cross pin 19 in engagement with the notches 18 so that the pin 7 cannot be accidentally turned, but by pulling the pin outwardly a sufficient distance to disengage the pin 19 from the notches 18, the pin 7 may be turned. When pin 7 is turned one way the hooks 11 will engage in the hair of the wearer. When turned the other way said hooks are swung up and disengaged. The opposite end of the pin 7 is provided with similar devices, that is, the wall of the crown of the hat is clamped between an inner plate 23 and an outer plate 24, with prongs 25 projecting from the plate 24 through the wall of the hat and through holes in the plate 23, with the ends of the prongs bent over as shown. This provides relatively fixed clamps at opposite sides of the hat which form bearings for the rod or pin 7, and in which said rod or pin may be turned as described.

In applying the fastening device to a hat the nut 9, the plates 24 and 23, the hooks 11, the friction washer 22, the spring 21 and the plate 15 are first stripped off of the pin 7, and said pin is then inserted through one wall of the crown of the hat. Then all of said parts except the plate 24 and the nut 9 are slipped onto the pin 7, the threaded end of which is then inserted through the opposite wall of the hat. Then the plate 24 is put on the pin 7, and the nut 9 screwed into place. The clamps 15 and 16 and 23 and 24 are then attached to the hat by pushing the prongs 20 and 25 through the same, and bending over the ends of said prongs. The portions of the pin 7 which pass through the clamping plates are round so that said pin may be turned. When the parts are adjusted to proper position and the hat is placed on the head of the wearer, the head 8 of the pin is pulled to shift the pin outwardly, after which it is given a half turn to insert the hooks 11 in the hair. The pin is then released, and the spring 21 shifts it back or inwardly until the cross pin 19 engages in the notches 18 which holds the parts as set and prevents accidental turning of the pin 7. To release the fastening, the pin 7 is pulled out slightly as described and then turned to withdraw the hooks 11 which swing up into the top part of the crown of the hat, thereby releasing the hat so that it can be taken off. The device can be changed from one hat to another by straightening the prongs 20 and 25, removing the nut 9, and pulling the pin out with sufficient force to strip the parts 21, 22 and 13 from the pin 7, after which the device can be put on another hat as above described. The washer 22 may be any suitable kind of a friction washer which will grasp the pin 7 sufficiently tight to support the pressure of the spring 21, but which will yield sufficiently to allow it to be stripped off of the pin 7 when extra force is applied, as in removing said pin from the hat. The spring grip afforded by the parts 13 and 14 is sufficient to hold the hooks in place, but nevertheless permitting the hooks to be stripped off of the pin 7 by the use of sufficient force.

I claim:

1. In a hat fastener, the combination of plates secured on opposite sides of the wall of the hat, one of said plates having a notch, a rod extending through the plates and having a projecting pin engageable in the notch to prevent rotation of the rod, teeth projecting from the rod, a friction washer on the rod, and a spring between the washer and the other of said plates, tending to hold the pin engaged in the notch, said rod being shiftable lengthwise against the tension of said spring to disengage the pin from the notch.

2. A hat fastener comprising a rod adapted to be turned in the hat, said rod having a flattened portion, a wire bent to form a pair of hooks and eyes through which the rod extends, and a connecting part between the eyes, said wire having an offset part engaging the flattened portion of the rod to prevent relative rotation of the hooks and rod.

In testimony whereof, I affix my signature in presence of two witnesses.

KONSTANTIN MERZIK.

Witnesses:
WILLIAM GUAN,
GERTRUDE WILLIAMS.